United States Patent [19]

Taylor et al.

[11] 4,164,124
[45] Aug. 14, 1979

[54] TURBINE SYSTEM USING UNCLEAN FUEL

[75] Inventors: David W. Taylor, Edgemont; Garland L. Fulton, Wayne, both of Pa.

[73] Assignee: Combustion Turbine Power, Inc., Bala Cynwyd, Pa.

[21] Appl. No.: 743,911

[22] Filed: Nov. 22, 1976

Related U.S. Application Data

[63] Continuation-in-part of Ser. No. 586,078, Jun. 11, 1975, abandoned.

[51] Int. Cl.$^2$ .................................................. F02C 1/06
[52] U.S. Cl. .......................................... 60/683; 60/682; 241/40; 241/79.1
[58] Field of Search ................ 60/39.46 S, 650, 672, 60/682, 683; 209/211; 48/DIG. 4; 241/39, 40, 79.1

[56] References Cited

U.S. PATENT DOCUMENTS

| | | | |
|---|---|---|---|
| 2,055,385 | 9/1936 | Noack | 241/40 |
| 2,341,638 | 2/1944 | Martinka | 60/682 X |
| 2,385,508 | 9/1945 | Hammond | 48/DIG. 4 |
| 2,420,335 | 5/1947 | Nettel et al. | 60/683 |
| 2,515,541 | 7/1950 | Yellott | 60/39.46 S |
| 2,550,390 | 4/1951 | Stephanoff | 241/39 |
| 2,914,391 | 11/1959 | Stratford | 241/39 |
| 3,630,022 | 12/1971 | Jubb | 60/644 |

Primary Examiner—Allen M. Ostrager
Assistant Examiner—Stephen F. Husar
Attorney, Agent, or Firm—Weiser, Stapler & Spivak

[57] ABSTRACT

Unclean fuel, such as coal is reduced to particle size passing 200 mesh in an attrition mill. Pyrite and ash removal is performed in conjunction with the attrition milling. The resulting fine particles are combusted in the turbine exhaust gas and the products of combustion indirectly heat the turbine operating gas. Control is provided by bypass around the heat exchanger and/or auxiliary clean fuel combustion.

13 Claims, 1 Drawing Figure

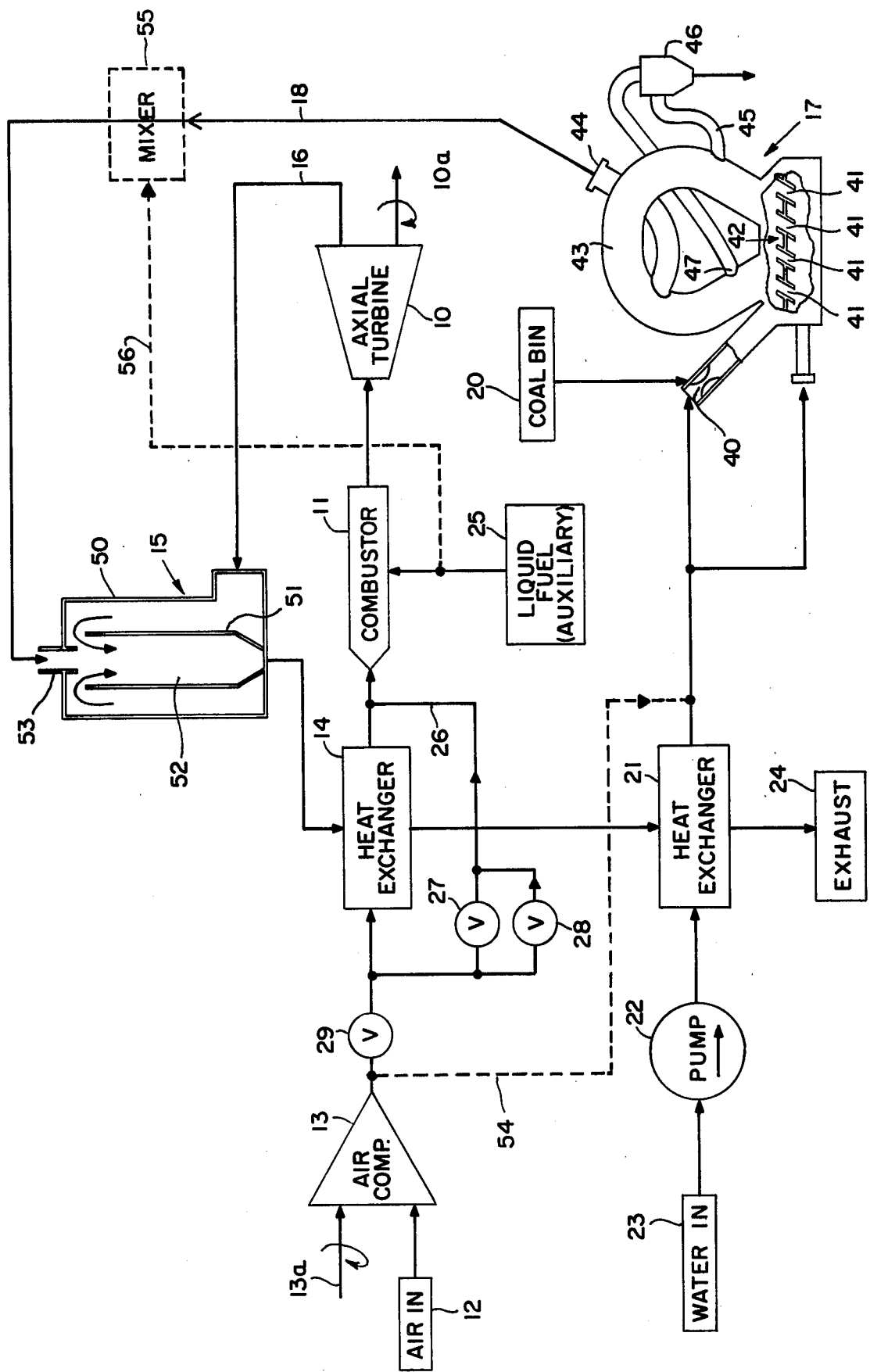

TURBINE SYSTEM USING UNCLEAN FUEL

This application is a continuation-in-part of application Ser. No. 586,078, filed June 11, 1975 now abandoned.

This invention relates to new and improved techniques for utilizing, as the fuel for turbines, materials which had heretofore not been considered directly suitable for that purpose.

In the above-identified prior application there are set forth some of the basic considerations which make certain materials unsuitable as fuels for directly powering gas turbines. For example, it is there pointed out that coal, although available in abundance, cannot be directly used as the fuel for gas turbines because the combustion of coal leaves residues which would damage the turbine if they were permitted reach the same together with the operating gases resulting from the combustion of the coal.

Also in the above-mentioned prior application, there is disclosed a basic system concept for dealing with this problem. This concept involves reducing the fuel material, e.g., coal, to an exceptionally fine powdery form, combusting this fine powdery material in the exhaust gas of the turbine, and using the resulting hot products of combustion to heat the gas to operate the turbine. This last heating is accomplished indirectly, in a heat exchanger, whereby those products of combustion which would be harmful to the turbine are prevented from commingling with the turbine operating air, so that the turbine is protected from damage by these combustion products.

Elaborating further on the factors which make it highly desirable to provide a truly practical system for utilizing unclean fuels, such as coal, to power turbines, it is noted that, of the electric power generating capacity presently installed in the U.S., approximately 40 million kw are provided by combustion turbines fired by gas or oil. Gas or oil is used because it constitutes a comparatively "clean" fuel and can therefore be used directly for combustion in the turbine operating air. It can be estimated that approximately one-fifth of this capacity can be realistically converted to using "unclean" fuel, such as coal, if a practical manner of using coal for this purpose is provided. This would represent a power generating capacity of about 8 million kw and the conversion could be readily effected within a span of five years. Considering only this possibility of converting existing capacity, and assuming further a usage of only two thousand hours a year, this conversion alone would represent a saving of about 30 million barrels of oil per year. This, in turn, can be calculated to provide a financial saving of about one half billion dollars per year in fuel costs for the electric utilities.

With regard to new installations, this possibility of using coal fired turbines is more difficult to analyze because it involves prediction of such installations. At present, the utilities have cut back their plans for expanding generating capacity, due to correct experience of demand lower than that based on historical forecasts. On the other hand, if and when higher growth rates resume, there is likely to be again a strong demand for additional combustion turbines. One reason is the extremely long lead time for the construction of other types of power plants, as compared with combustion turbines. As an illustration of this phenomenon as it has occurred in the past, in 1963 the utilities were operating with a capacity which exceeded demand by 30%. By 1967, this margin had dropped to 18% and this led the utilities to install approximately 30 million kw of combustion turbines in the next five years. A similar effect can be expected when the next upswing in demand, leading to corresponding reduction in capacity margin, takes place. Indeed, there are projections that in the period 1977 to 1980 installation of approximately 100 million kw of additional combustion turbines will be necessary to compensate for the above-mentioned recent cutbacks in plans for other types of power plants. If this were to be accomplished using oil as the fuel, it would add a burden of about 1 million barrels of oil per day to U.S. consumption. Combustion turbine systems fired by coal, on the other hand, would obviously eliminate this requirement for additional fuel oil while continuing to provide the benefit of short lead time and low cost installation.

Another advantage is that industrial plants would find it more attractive to utilize in-house electric power generating facilities. As will be seen, this would be promoted by the fact that waste heat can additionally be used to produce process steam, in substantial quantities and at no additional fuel cost.

A variety of proposals have been made from time to time for meeting the need described above. However, these all suffered, in one way or another, from significant shortcomings. For example some such prior proposals involved the utilization of the unclean fuel, e.g. coal, to first produce clean fuel as, for example, by deriving from the coal the volatile constituents thereof. This type of proposal, although certainly feasible, was associated with high capital investments which tended to render it uneconomical in practice.

Other proposals failed to give sufficient attention to various practical problems. Among these are such factors as the high inherent variability in the constitution of an unclean fuel such as coal. Unlike fuel oil, coal is much more subject to inherent variations in such important factors as moisture content, hardness, grindability and impurity content.

Accordingly, it is an object of the present invention to provide improved techniques for utilizing unclean fuel to power turbines.

It is another object to provide an improved technique for utilizing coal to power such turbines.

It is another object to provide a turbine system which utilizes unclean fuel, and which is free of the requirement that clean components be initially derived from that fuel.

It is another object to provide a system for utilizing coal to power turbines which is not hampered by excessive capital equipment costs attributable to fuel preparation.

It is still another object to provide a technique for utilizing coal to power combustion turbines, which is capable of accommodating the wide variations in inherent properties that characterize the coal.

These and other objects of the invention which will appear are achieved by a system which can briefly be characterized as follows.

Compressed air for operating the turbine is indirectly heated. After expansion through the turbine, this air is further used to burn very finely divided coal. The hot combustion products are used in a heat exchanger to perform the indirect heating of the turbine operating air which was previously mentioned.

A fluid energy mill prepares the coal for combustion by reducing its particle size to 100% passing 200 mesh, or smaller. Preferably, the fluid energy mill has provisions for removing certain contaminants such as pyritic sulfur and extraneous ash from the coal as its size is being reduced.

Rapid and precise control of turbine response to accomodate load changes is accomplished by providing for controllable by-pass of a portion of the compressed operating gas around the indirect heating means. For starting, a cranking means such as an internal combustion engine, turbine, electric motor or the like is used to circulate air through the system. Thereafter combustion of fuel at increasing rates provides increasingly higher turbine inlet air temperature until full rotational speed is achieved, whereupon the system operates normally. Also, provision may be made for firing clean fuel in the compressed turbine operating air exiting the indirect heating means. This provides heating of that air during start-up while the heating surfaces of the indirect heating means itself are still at a relatively low temperature.

Such direct firing of clean fuel can also be used during normal conditions as an additional means of controlling the turbine output. Likewise, it can be used to supplement the indirect heating if desired to provide higher inlet temperatures to the turbine and increased power output.

The means previously mentioned for by-passing compressed air around the indirect heating means can also serve to accomplish shut-down of the system by reducing the inlet temperature to the turbine. Likewise, such by-passing reduces thermal shock to the structural elements of the indirect heating means, particularly during rapid shut-down.

For further details, reference is made to the discussion which follows, in the light of the accompanying drawing wherein the single FIGURE shows in diagrammatic form a preferred embodiment of the invention.

Referring now to the drawing, the system there illustrated includes a conventional combustion, or axial turbine 10 which, when in operation, develops rotating power at shaft 10a. Turbine 10 is supplied with operating gas through a conventional combustor 11. This gas starts out as air at atmospheric pressure, as symbolically indicated at 12 in the drawing. Its pressure is raised by means of a conventional air compressor 13 driven in conventional manner (e.g. from turbine 10) through rotating shaft 13a. The air, with its pressure thus raised, is supplied to heat exchange 14, then to combustor 11, and through it to turbine 10, as previously noted.

Heat exchanger 14 is also supplied with the products of combustion produced in a burner 15. This burner, in turn, is supplied with the exhaust gas from axial turbine 10 through a conduit 16, and with the output material from a grinder 17 through conduit 18. Grinder 17 receives its input material from two sources, one being a storage bin 20 which contains coal in comminuted form, and the other being steam from a heat exchanger 21. Heat exchanger 21, in turn, is supplied with water under pressure from a pump 22, which derives its water at ambient pressure from a source thereof, symbolically indicated at 23. The heat exchanger 21 is also supplied with the products of combustion from burner 15 after the latter have traversed heat exchanger 14.

These products of combustion from burner 15 are ultimately disposed of through exhaust 24, after passage through heat exchanger 21.

Provision is also made for supplying liquid fuel to combustor 11 from an auxiliary store 25 of such fuel. A by-pass pipe 26 containing a valve 27 is connected between the compressor 13 and combustor 11. Preferably an additional valve 28 in turn by-passes valve 27. A blow-off device 29 is also connected to the output of compressor 13.

The system operates as follows.

The air for expansion through turbine 10 is first compressed in conventional air compressor 13 and is then subjected to heating to essentially turbine operating temperature in heat exchanger 14. This heating is accomplished, not through direct combustion of the fuel in that air, but through indirect heating by the products of combustion from burner 15.

Combustor 11, through which the air so heated in heat exchanger 14 passes before reaching turbine 10, serves an auxiliary heating function and is used as required. When used, it is fueled with liquid fuel or gaseous from auxiliary fuel store 25. There are essentially two circumstances when combustor 11 may be used. One is during the start-up of the system; the other is to accomodate peak loads placed on the output of the turbine 10.

The products of combustion from burner 15 are the result of burning finely divided coal in the exhaust gas from turbine 10. The finely divided coal is derived from grinder 17. The coal is originally introduced into the system from bin 20 in conventionally comminuted form. Also introduced into the system is water (at 23), whose pressure is raised by pump 22, and which is converted into high pressure steam in heat exchanger 21. This heat exchanger 21 uses the residual heat in the products of combustion from burner 15, after they have been used in heat exchanger 14 to heat the turbine operating air to operating temperature.

The steam produced by heat exchanger 21 is then supplied to grinder 17.

In the grinder 17, the size of the coal particles is further reduced. The reduction takes place to a size which is suitable for accomplishing as complete combustion as practical in burner 15.

Preferably, the grinder 17 takes the form of a toroidal attrition mill (also known as a fluid energy mill) of known construction. Such a mill is described, for example, in a publication, Bulletin M1, by Fluid Energy Processing and Equipment Company, Hatfield, Pennsylvania. A copy of that publication is on file with the above-mentioned prior application, Ser. No. 586,078. In such a mill, the high velocity steam from the evaporator serves as the driving medium. The mill is so constructed that the particle size of coal exiting the mill and passing through conduit 18 into burner 15 will be no larger than about 200 mesh. The temperature of the steam and the entrained finely divided coal supplied to the attrition mill constituting grinder 17 will range between about 250° F. and 350° F., but may be even higher. The steam will have been derived from high pressure water, about 200 psia or less, heated to about 500° F.; in heat exchanger 21 by the combustion products exhausted from heat exchanger 14.

A portion of the steam from heat exchanger 21 is introduced into the mill 17 via venturi 40, wherein it is expanded to a high velocity stream; coal is drawn into the low pressure throat of the venturi from coal bin 20 and is accelerated by the high velocity steam. The rest of the steam supplies nozzles 41, wherefrom high velocity jets intercept the mixture of coal and steam exiting the venturi 40. This creates extreme turbulence, which causes the solid coal particles to be subjected to numerous self-impingements, with size reduction resulting from this attrition. These aforedescribed actions occur primarily in the base 42 of the fluid energy mill, and this section is therefore called the grinding zone. Effluent from the grinding zone exits through a vertically disposed and preferably generally toroidal conduit 43, wherein the solid material is classified by centrifugal forces due to specific gravity and buoyancy differences in viscous flow fluid.

Before introduction into bin 20, the coal will preferably have been reduced to about one-eigth inch size. e.g., by passage through a conventional hammer mill (not shown).

Effluent from the grinding zone is mainly coal, and particles of impurities entrained in the steam, notably pyrites, but also including other ash. Finely divided coal has low specific gravity and high buoyancy, and traverses the inner diameter of the circular conduit 43, from which it is exhausted via outlet conduit 44 leading to pipe 18. The pyrite and ash are of high specific gravity and harder than coal (thus size and buoyancy reduction takes longer) and will generally traverse the classification zone at its outer diameter. A small amount of the operating gas is bled from a point of generally high pressure 45 on the outer diameter of the classification zone and contains a substantial percentage of the pyrite and ash. This extracted stream enters a high efficiency separator 46, e.g., a cyclone, which removes the high specific gravity substances, pyrite and ash. If desired, the gas and low buoyancy and specific gravity substance, namely coal, passing through separator 46, may be returned to a point 47 in the classification zone of grinder 17 of relatively low pressure. The pressure difference between the points of extraction 45 and reentry 47 is sufficient to insure adequate flow through separator 46 to effect substantial removal of pyrite and ash from the coal, thus, in effect, producing a refined coal product for combustion in burner 15.

In practice it is found that in the attrition mill 17 one quarter pound of steam will produce one pound of coal at 100% minus 200 mesh, and one-half pound of steam will produce one pound of coal at 100% minus 40 microns. A 40 micron top size is preferred. Only a small portion of the product coal will be of such top size, average particle size being about one-fourth or smaller, of this top size.

The aforedescribed fluid energy attrition milling provides a product having the following highly desirable characteristics for the operation of the overall turbine system:

1. No oversized coal is delivered into the burner 15.
2. The particles of coal delivered to the burner are highly reactive.
3. The coal will burn instantaneously in preheated excess air at low flame temperature.
4. Very fast reaction to fuel feed control.
5. Effective beneficiation of the coal so as to minimize gas cleanup.
6. Complete combustion in small volume of containment.
7. Ash particles of small size which will cool instantaneously and not cause slagging.
8. Small ash size to prevent accumulation in conduits.
9. Removal of iron compounds which are precursors to low temperature slagging substances.
10. Removal of substances such as heavy metals which would otherwise catalyze the oxidation of $SO_2$ to $SO_3$, thereby ultimately reducing the content of sulfate salts in the ash.

While steam has been described for use as the fluid in attrition mill 17, other gases can also be used. For example, turbine inlet gas can be bled from compressor 13 and supplied to mill 17 in lieu of steam.

As previously stated, the air leaving the expansion turbine 10 is reheated by means of coal combustion in burner 15 to provide high temperature gas to heat exchanger 14.

Burner 15 preferably has a generally cylindrical containment shell 50 with a liner 51 coaxially located therein. Air from turbine 10 via pipe 16 enters the lower end of the containment shell and flows upward in the annular chamber between the shell and the liner, entering the combustion chamber 52 within the liner at the top of the burner. There it is mixed with the coal/gas fuel feed entering the combustion chamber from pipe 18 via nozzle 53. Rapid mixing of air and fuel streams is provided by suitable guide vanes, diffusers and the like (not shown). Ensuing combustion is spontaneous, due to the elevated temperature of the air from the expansion turbine exhaust, and the extremely reactive nature of the surfaces of the finely divided coal.

The small mass and the large ratio of surface area to volume of the coal particles insures extremely rapid consumption of the combustibles, low flame temperatures and almost instantaneous temperature equalization between the gas and ash particles.

Radiation absorption by the liner 51 is minimized by the low flame temperatures, high air/fuel ratios and the low percentage of carbon dioxide and water vapor. The relatively lower temperature of the expansion turbine exhaust air serves to cool the liner 51 as it traverses the annular chamber between the containment shell 50 and the liner 51. The liner may be provided with holes, slots or the like (not shown) to permit a portion of the cooler air to enter the combustion chamber and provide a layer of cooler air between the liner and the heated air, thereby further reducing the temperature of the liner material.

The mixing of the coal/gas fuel feed with air in the combustion chamber 52 is analogous to the mixing of natural gas and air in a gas combustion system. The acutal combustion of the coal is analogous to the combustion of oil droplets suspended in air. Because the coal particles are generally smaller than corresponding atomized oil droplets would be, the coal will be consumed within a flame geometry essentially equivalent to that of oil. Therefore the containment value of the instant burner need be only about one-third that of a conventional pulverized coal burner.

Unlike oil or natural gas, the nature of attrition milling renders the surfaces of the very small coal particles chemically reactive to the point where they are pyrophoric. Consequently, when they are subjected to intimate contact with air at elevated temperature and flame radiation, combustion will be initiated spontaneously. The flame temperatures will be low; substantially lower than in the combustion of coal conventionally in coal burning burners or the like. These flame temperatures will in no case exceed 2600° F. and will preferably be no higher than 2400° F. and even more preferably no higher than 2000° F. Among other advantages, this makes it possible to construct the burner without the need for refractory liners.

These low flame temperatures also tend to reduce $NO_x$ formation, retard decomposition of complex alkali and alkaline earth compounds which provide source material for fusible salts, and promote uniform temperatures throughout the products exiting the combustion chamber 52, without the formation of slag and below a temperature at which any particle will be in a plastic or sticky condition as it enters heat exchanger 14. $NO_x$ is a catalyst for the oxidation of $SO_2$ and $SO_3$, and significant $NO_x$ reduction by the instant low temperature combustion at atmospheric pressure will operate to reduce the formation of sulfate salts which could cause corrosion and low temperature slagging.

Ash particles will be of such size, under 36 microns maximum, that they will be buoyant in the gas stream traversing conduits and heat exchanger, without appreciable tendency to drop out and accumulate so as to necessitate provision of an ash removal system. Complete combustion of small size coal particles insures against unburned carbonaceous substances being included in the ash traversing metal surfaces while hot due to continuing combustion and whereon carbon would be otherwise absorbed thereby changing the metallurgical characteristics of these surfaces.

The burner 15 is preferably provided with auxiliary oil or gas combustion means (not shown) for use in start-up, to prevent $H_2SO_4$ condensation in the cold metal circuit downstream, and to provide an emergency alternative fuel capability.

Maximum system efficiency, including specific power output and coal utilization, are realized at maximum expansion turbine inlet temperatures. Therefore, it is a feature of the invention to maximize heat exchanger surface temperatures and to accomodate the products of coal combustion at temperatures which will effect the required temperature rise of the compressed turbine operating air within the effectiveness of the heat exchanger. The minimum acceptable compressed turbine operating air temperature is about 1300° F. Assuming a heat exchanger 14 effectivenss of 0.86, the gas supplied to the heat exchanger 14 must be at a temperature of about 1450° F. Presently available heat exchangers are capable of this performance when burning oil or gas. Moreover, significantly higher temperatures can be attained by utilizing state-of-the-art alloy steels, with suitable metallurgical properties. For instance, Hastelloy R235 at 1800° F. should provide a compressed operating air temperature exiting the heat exchanger of about 1700° F. with the gas inlet temperature 1850° F. and this alloy at a metal temperature of 1800° F. has a rupture strength of 2000 psi and creep of 2000 psi.

The heat exchanger metal is protected against corrosion by virtue of the coal preparation and combustion techniques used. No oversize particles are present which might otherwise not be combusted before entering heat exchanger 14 and would therefore lead to slag deposition. All coal particles are substantially completely consumed within burner 15, and the resultant ash particles will have cooled to essentially the temperature of the entraining gas, well below the temperature at which these ash particles would be in a plastic and sticky condition. Hot sulfate corrosion can occur at the interface of metal and slag deposits wherein sulfates are reduced to sulfides and metal is oxidized to metal oxide. Since the coal which is burned in the system of the invention will be very low in iron, as a result of beneficiation in fluid energy mill 17, the ash traversing heat exchanger 14 will contain very low amounts of these iron compounds, which otherwise might cause low temperature slag deposition.

The gas temperature is kept above that (about 350° F.) at which sulfur trioxide unites with water and condenses as sulfuric acid.

This prevents metal corrosion by sulfuric acid. It also prevents the reaction between the sulfuric acid and ash products which might lead to plugging due to deposition, as is common in air preheaters utilized in coal/steam boilers.

To prevent erosion, low gas velocities are utilized, about 40 to about 60 feet per second at the face of heat exchanger 14. However, these velocities are still sufficiently high to permit the dry ash to exert a light abrasive action on the metal surfaces, thereby effecting removal of the condensed alkali and alkaline earth fusible salts.

Native coal contains sensible amounts of alkali and alkaline earth compounds mostly in the form of complex salts which decompose at high temperature and recombine with sulfur, chlorine and the like to produce salts of relatively high vapor pressure at the temperatures of the gas entering heat exchanger 14. As the gas cools in traversing the heat exchanger, the vapor pressure of these salts decreases, and condensation of the salts may occur. It is a feature of the invention that accumulation of such products of condensation is minimized. To that end, provisions are made for minimum temperature difference between the metal surfaces and the gas, ample fine particle ash content of the gas to serve as nucleation points for condensation and agglomeration of ash into non-adherent masses onto the condensate, and adequate velocity of ash to provide a scrubbing effect on the metal surfaces, in addition to refining of the coal in grinder (17).

Chemical additives such as manganese, aluminum and magnesium compounds may be incorporated in the coal to reduce the vapor pressures of alkali and alkaline earth compounds by promoting the formation of low vapor pressure complex compounds. Also, suitable chemical additives may be used to lower sintering strengths of condensate so as to render them more easily removable by soot blowing and thermal shock.

Fluid energy mill 17 will remove from the coal most of the alkaline minerals which lead to fusible salt deposition on heat transfer surfaces, and the low flame temperatures in burner 15 will minimize volatilization of alkaline compounds. In addition, an automatic cleaning system for heat exchanger 14 may be employed to remove deposits during system operation, so that it is not necessary to take the system out of service for maintenance. The total volume and composition of alkalis introduced into the heat exchanger will determine the specific type of automatic cleaning system employed. For the plate-fin type heat exchanger, this cleaning system (not shown) may consist of a telescoping mechanism extending from the cold end of the heat exchanger, through the entire deposition length of the plate ducts. The mechanism has a rotating head containing either an abrasive material to wipe the plates clean, or a nozzle to displace the deposits by compressed air or steam lancing. The telescoping mechanism moves at a programmed rate to each plate duct, on a track located at the heat exchanger cold end duct-work, thereby making the mechanism itself readily accessible for maintenance.

For a tubular heat exchanger, conventional steam boiler sootblowing mechanisms may be utilized to control alkali salt deposition.

As previously noted, a by-pass pipe 26 is provided around heat exchanger 14. This pipe has a valve 27 which is, in turn, by-passed by a valve 28. By adjustment of valves 27 and 28 it is possible to control the proportions of turbine operating air which respectively flow through heat exchanger 14 and which by-pass that heat exchanger. By directing a larger proportion of this air through pipe 26 it is possible to reduce the cooling effect of the compressed air on the heat exchanger during start-up. Likewise, it is possible to control the mix of cool air from the compressor and hot air from the heat exchanger, in order to control the power output of the expansion turbine 10 and thereby accomodate swings in load. Finally, bypassing of air during shut-down prevents rapid cooling of the heat exchanger metal and possible thermal shock thereto.

Valve 27 may be controlled by a motor (not shown), actuated by suitable control signals. Associated with valve 27 is blow-off device 29 which vents the compressor outlet to atmosphere under emergency conditions requiring immediate shutdown.

The flow resistance via bypass pipe 26 can be made significantly lower than that via heat exchanger 14. This assures that it will be possible to provide turbine inlet temperatures between a maximum required for full load and a minimum at which the turbine will no longer provide sufficient torque to drive air compressor 13 at rated speed.

In a practical system, the dimensions of by-pass pipe 26 will be of the order of 24″ in diameter, and valve 27 will have to be correspondingly large in order to be able to control the proportion of by-passed air over its full range. However, such full-range control will typically be needed only during start-up and shutdown. For modulation to accomodate load changes, comparatively small adjustments will normally be required and, for this large valve 27 may be awkward. For that reason, valve 28 is provided. This valve is sized to provide only the comparatively small range of control needed during steady state operation.

Combustor 11 is provided for the purpose of raising turbine operating air temperature by the combustion of clean fuel.

Specifically, oil (or gas) may be burned in combustor 11 to make available high temperature air at the expansion turbine inlet during starting, so as to reduce cranking requirements by virtue of the useful torque which will be produced by the expansion turbine under this condition. Additionally, by burning variable quantities of fuel in combustor 11 during steady state operation of the system, turbine power output may be modulated rapidly to meet load variation requirements. Burning fuel in combustor 11 will deliver higher temperature air to expansion turbine 10 than by indirect heating alone, because pressure balanced piping may be used to cool the metal containments of the high temperature metal by lower temperature compressed turbine operating air. This feature significantly adds to the specific power output and fuel economy of the system.

Alternatively, a combustor 11 may be connected in by-pass pipe 26. Preferably, this arrangement would be used for start-up only. During steady-state operation, this combustor would be disconnected from pipe 26 to eliminate the restriction and pressure drop which it would otherwise create in the pipe.

In either alternative, it is possible to bypass substantial amounts of air around heat exchanger 14 during startup, so as to reduce heat extraction therefrom. This reduces the time required to achieve in the heat exchanger those temperatures which are needed for self-sustained turbine operation and loading, while simultaneously adding to the system heat input and realizing the torque contribution provided by the expansion turbine 10.

Using either alternative position of combustor 11, it is possible to effect a fast start by burning clean fuel in the compressed turbine operating air to achieve maximum acceleration to the point of loading, and continuing to burn the clean fuel in combustor 11 after loading. The metal temperature rise with time in heat exchanger 14 can be controlled by the amount of air traversing the heat exchanger, as regulated by by-pass valves, 27, 28. It can be further controlled, if desired, by a damper, (not shown), suitably located to vent the turbine exhaust or a portion of it to atmosphere so as to prevent an excessive amount of hot turbine exhaust traversing heat exchanger 14 while it is still cold. For a fast start, water may also be injected into the compressed operating air so as to reduce its temperature substantially, before it traverses a cold heat exchanger 14, thereby reducing the possibility of thermal shock to the heat exchanger both from the hot compressed air and from hot gas from the turbine exhaust.

Such water injection may be continued during steady-state operation to increase the specific power output of the system and reduce the heat rejection of the system exhaust. The compressor discharge air is at elevated temperature, and in case of the instant illustration about 503° F. If it is desired to reduce this temperature to 250° F. about 0.056 lb. of water will be injected per pound of compressed turbine operating air before the air reaches heat exchanger 14.

Reduction in the temperature of the compressor discharge air will permit lower heat exchanger gas outlet temperatures and the injected water will provide higher mass flow through the expansion turbine, resulting in higher system efficiencies and specific power output.

It is well known that high pressure ratio gas turbines are not well suited for regenerative configuration because the compressor air discharge temperatures are high, which prevents sufficient heat extraction from the exhaust gas by the compressed turbine operating air, resulting in high final exhaust temperatures. Water injected into the compressed turbine operating air before it traverses the heat exchanger will cool it significantly and thereby overcome this problem.

Otherwise extensive waste heat recovery equipment will be required to reduce the final exhaust temperature so as to improve system efficiency. This heat may be utilized to provide process steam, drive a steam turbine, or it may be utilized in an organic bottoming cycle to generate more power.

Cooling the compressed turbine operating air will also permit faster starting of the system when firing combustor 11, because it will cool the heat exchanger metal which may be heated at an excessive rate by the turbine exhaust gas.

At a given mass flow and pressure, the power output of a combustion turbine is determined by the temperature of the compressed operating gas entering the expansion turbine.

In conventional combustion turbines, it is customary to burn fuel in the compressed turbine operating air at a rate to provide an expansion turbine gas inlet temperature corresponding to the power output required.

Provisions are made to sense the power output requirements. For example, there may be measured the difference in phase angle of a turbine driven generator and the line it is feeding, or the difference between the actual shaft speed of the turbine and that required to provide the needed power. These differences are then translated into corrective variations in the fuel flow to the combustors.

In the present invention, two methods of control provide the required expansion turbine inlet temperature. Valves 27, 28 divert a controlled proportion of the compressed turbine operating air around heat exchanger 14, after which it is mixed with the relatively hot air which has traversed the heat exchanger. By varying the proportion of air so bypassed, the heat exchanger can operate at a relatively constant temperature, and yet a wide range of expansion turbine inlet air temperatures can be provided.

Changes in expansion turbine inlet temperatures also change the air temperature entering burner 15, while changes in the mass flow of compressed turbine operating air traversing heat exchanger 14 cause variations in the temperature requirements of the products of combustion exiting burner 15. Therefore, a secondary control means is provided to modulate the rate at which coal is fed into attrition mill 17, this rate being determined by the temperature of the gas exiting burner 15 to maintain a relatively constant heat exchanger metal temperature.

In a practical embodiment, heat exchanger 14 typically has great mass (say 400,000 lbs.) relative to heat exchange rate (say 50,000 Btu per second), i.e., a ratio of 8 pounds per Btu per second. Consequently, the thermal inertia of the heat exchanger is high.

Therefore, control of the present system is preferably achieved by utilizing known sensors and translators to control differential mass flows of compressed turbine operating air through heat exchanger 14 and bypass conduit 26 and to regulate the fuel feed into the burner 15.

In case of low power output requirement for the system, it may be desirable to decrease the gas flow through attrition mill 17.

This may be done not by simply throttling the overall flow of material through the mill 17. Rather, provision may be made to selectively shut off the steam (or gas) supply to one or more of the nozzles in the grinding zone of the mill thereby effecting reduced output. Accomodation of large volumes of hot gas will require large containers such as pipes, gas scrolls to distribute the hot gas to the turbine nozzles, transition piece and the like. Very heavy sections and alloy steel usage will be avoided by providing pressure balanced coaxial ducts for the hot gas. An inner liner of alloy steel is surrounded by insulating material and is pressure equalized to that within the duct. An outer structure contains the insulation and liner and will be at substantial lower temperature so as to use thinner sections of carbon steel to contain the pressure. This construction will minimize the number of expansion joints required and structural problems.

Under starting conditions, it is necessary to employ auxiliary means to achieve operation in a self sustaining mode.

A cranking means is used to exert torque on the compressor shaft 13a and accelerate the machine so as to provide air flow through the system and support combustion of fuel in burner 15. During starting, inadequate heated gas for operating mill 17 will be available. Therefore, it is desirable to utilize oil or gas in burner 15 until the system can itself provide gas in sufficient condition and quantity to drive attrition mill 17.

Under typical practical conditions, starting may be achieved by cranking the compressor 13 to about 20% and 25% speed to provide about 20 pounds per second of air flow and requiring about 300 H.P. Fuel is initially burned in burner 15 to deliver air at about 800° F. to the heat exchanger 14. Thereafter, fuel continues to be burned in burner 15 to provide a programmed heat exchanger inlet temperature which increases with time in accordance with permissible limits imposed by metallurgical and structural considerations. As the resulting expansion turbine air inlet temperature increases, expansion turbine 10 provides a torque which permits the cranking means to accelerate the compressor up to about 50% speed. When heat exchanger 14 delivers expansion turbine inlet air over 900° F. at this rotational speed, the system will accelerate further, permitting disengaging of the cranking means. From that point on, acceleration is achieved solely by increasing the temperature of the expansion turbine inlet air.

It can be shown that the operating characteristics of this turbine system are such that, at comparatively low turbine inlet temperature, the shaft horsepower produced by the turbine actually declines as rated, synchronous speed is approached. In a typical case this horsepower drops to near zero at temperatures in the neighborhood of 850° F. while the turbine speed remains at or near the synchronous value. What this means is that the load can be completely removed from the turbine, and yet merely by bypassing a sufficient proportion of compressor air around heat exchanger 14 to lower the temperature of the air reaching the turbine sufficiently, the turbine can be kept running, ready for quick load pickup when this is again needed eliminating the need to shut down and go thru start-up procedure after the required cool down period.

After the system achieves full speed, it will be possible to generate steam from the system exhaust, or bleed off compressed turbine operating air through pipe 54 to provide means for driving fluid energy mill 17. From this point on, coal is burned instead of oil.

It will be understood that if an adequate auxiliary supply of compressed air or steam is available to the system, it is possible to operate fluid energy mill 17 on coal even during start-up.

Additional power capacity may be added to the system by extracting heat from the high temperature gaseous products of combustion exiting heat exchanger 14 or 21. It is possible to utilize, for instance, a conventional waste heat boiler and low pressure steam turbine system.

Another waste heat system may utilize a working fluid such as isobutane, sulfur dioxide, and the like. A typical cycle for such an embodiment of the invention would receive hot gas from heat exchanger 14 at about 850° F. which would traverse an isobutane boiler, wherein the isobutane enters at a temperature of 305° F. and at a pressure of 1000 psia and is heated therein to 528° F. The hot and gaseous isobutane is then expanded through a turbine to a pressure of 96 psia and to a temperature of 380° F., wherefrom it enters a regenerative heater wherein it is cooled to 140° F. by compressed isobutane. Exiting the regenerative heater the low pressure isobutane traverses a condenser wherein it is cooled and condensed to liquid form and exits the condenser at a temperature of 120° F., the heat being rejected to atmospheric cooling air or cooling water. Low pressure liquid isobutane is then compressed by a pump to 1000 psia and heated to 305° F. in the regenerative heater, wherefrom it traverses the boiler.

This cycle operates at a thermal efficiency of about 27% and can deliver about 4770 kw of power, extracting about 1,000,000 Btu per minute from exhaust gas and lowering its temperature to about 503° F. By reducing the exhaust temperature, less exotic and expensive stack gas clean up equipment (such as bag filters) may be used.

Effluent from fluid energy mill 17, consisting of gas and entrained coal, may be mixed in mixer 55 supplied through pipe 56 with oil to form a stable mixture of liquid fuel, including suspended therein particulate carbonaceous material in solid form and of sufficiently small particle size, about 40 micron top, to form a stable suspension of the particulate fuel in the liquid fuel.

Following such mixing, the entraining gas is vented from the fuel mixture through a suitable means such as a bag filter.

Mixing is achieved by suitable means such as spraying the liquid fuel into coal separated from the coal/gas effluent from the mill, as for instance by a cyclone. If necessary, external means may be used to cool the mixture and any condensed water may then be removed by gravimetric separators. These mixtures may contain up to 60% or more coal.

Because of the small particle size and spheroid shape of the suspended solid fuel it is possible to impart to the mixture a viscosity such that it can be handled in essentially the same manner as the liquid fuel alone. Combustion of the composite fuel is then accomplished in the same conventional manner as is provided for liquid fuel combustion during start-up.

Gaseous fuels may also be utilized by the instant invention, by heating the effluent steam/coal mixture of fluid energy mill 17 to a sufficiently high temperature to effect the endothermic reaction between the steam and carbon to produce carbon monoxide, carbon dioxide and hydrogen.

This endothermic heat may be supplied indirectly by the air exhausted from expansion turbine 10, after having been suitably heated, as for instance, by burner 15. In that case, the temperature of the air exiting from burner 15 is maintained at a temperature which insures that sufficient heat is extracted therefrom by the endothermic reaction between the coal and steam so that the inlet temperature of the products of combustion into the heat exchanger 14 will not be excessive.

Following consumption, through the endothermic reaction, of the carbonaceous matter in the coal, the resultant products may be treated to remove particulate matter (ash) and corrosive gaseous products (hydrogen sulfide, hydrogen chloride). The remaining gaseous fuel stream may be introduced into burner 15 via conventional gas burning means, thus, reducing the flow through heat exchanger 14 of substances which might cause corrosion and condensation.

Alkaline earth carbonates may be mixed with the coal gas feed so as to react with the hydrogen sulfide and hydrogen chloride during the endothermic gasification step, to facilitate the scrubbing of the fuel gas before it is introduced in burner 15.

It is believed to be apparent that the present invention represents a viable and valuable contribution to the art, and some of the reasons are:

1. Coal is available and will remain a reliable power generation fuel.
2. Run of mine unwashed coal can be used due to the beneficiation of raw coal effected by the separation circuit of the fluid energy mill.
3. The fuel preparation system is relatively insensitive to the nature of solid feedstock: moisture content, hardness, grindability, impurity content.
4. The fuel preparation system extracts major amounts of impurities such as pyritic sulfur before the fuel is burned. This feature reduces the stack gas clean up burden and greatly broadens the reserve base of coals suitable for combustion within economic limits.
5. The system can prepare and utilize coal/oil mixtures.
6. The system can prepare and utilize gaseous fuel from coal.
7. The low quality and less expensive fuels may be utilized: bunker C oil, number 6 oil, crude oil, wastes.
8. The system is able to utilize the developing "clean fuels" derived from coal; these fuels are expected to still contain sufficient contaminants so as to fail to meet the fuel specifications for direct introduction into internal combustion gas turbines.
9. Flyash with very low carbon content can be recovered and made available as a valuable additive to cement.
10. Low combustion temperatures significantly lower NOx emissions.
11. Moisture in the fuel feed lowers NOx emissions.
12. Waste heat becomes available, thereby making the system especially attractive to users with a need for process heat.
13. The system can be integrated into many combined cycle designs.
14. The costs of coal energy is less than half that of oil.
15. Petroleum consumption must be reduced where substitute fuels are available and can be utilized.
16. The system will benefit from the anticipated improvements in equipment (higher temperatures) cycle modifications (combined cycle applications) and the like within the present state of the art and anticipated improvements in the art.
17. The system requires no cooling water.
18. The system design is simple, thereby assuring a high degree of reliability.
19. Factory packaging can provide a low installed cost and short manufacturing lead times.
20. Power will be available to users in financially feasible increments so that power generation capability can be held at high levels.
21. The system will present a low profile and, therefore, not seriously detract from the environment.

We claim:
1. A turbine system which includes a compressor and means for supplying the output from the compressor to the turbine as its operating gas, the system comprising:
   means including a fluid energy attrition mill for providing unclean particulate fuel with particle sizes substantially 100% passing 200 mesh, the attrition mill including a toroidal loop;
   means for removing from the unclean fuel a substantial proportion of pyrites contained in the fuel, the removing means being a by-pass circuit coupled to the attrition mill, the by-pass circuit including a tap-off from a high pressure region of the toroidal loop and return tap to the low pressure region;

means for combusting the fuel with pyrites removed in exhaust gas from the turbine at a flame temperature not in excess of 2600° F.;

means for utilizing the output of the combustion means to indirectly heat turbine operating gas; and means for supplying mill operating gas to the attrition mill, the mill operating gas being steam produced by an indirect heating means supplied with the output of the combustion means after utilization in the utilizing means.

2. The system of claim 1 wherein the fuel providing means further includes means for providing to the attrition mill particulate fuel of about minus ⅛ mesh size.

3. The system of claim 1 further including solid separating means between the taps.

4. The system of claim 3 wherein the separator means is a cyclone.

5. The system of claim 1 further comprising means for controllably bypassing a portion of the compressor output around the indirect heating means.

6. The system of claim 5 wherein the bypassing means includes a controllable valve means for varying the bypass proportion.

7. The system of claim 6 wherein the controllable valve means includes two separate valves connected in parallel with each other.

8. The system of claim 7 wherein one valve has much smaller variable capacity than the other.

9. The system of claim 1 wherein the fuel is coal.

10. The system of claim 9 comprising means for at least partially gasifying the coal with pyrite removed.

11. The system of claim 9 comprising means for placing the coal with pyrite removed in suspension with fuel oil.

12. The system of claim 1 wherein steam used as mill operating gas accompanies the fuel into the combusting means.

13. The system of claim 1 wherein the flame temperature in the combusting means is no higher than 2000° F.

* * * * *